United States Patent
Bassily et al.

(10) Patent No.: US 8,839,664 B2
(45) Date of Patent: Sep. 23, 2014

(54) DETECTION AND CLASSIFICATION OF FAILURES OF POWER GENERATING EQUIPMENT DURING TRANSIENT CONDITIONS

(71) Applicants: Hany F. Bassily, Oviedo, FL (US); Ethan D. Frolich, Oviedo, FL (US); Benjamin E. Bassford, Orlando, FL (US)

(72) Inventors: Hany F. Bassily, Oviedo, FL (US); Ethan D. Frolich, Oviedo, FL (US); Benjamin E. Bassford, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 30 days.

(21) Appl. No.: 13/747,548

(22) Filed: Jan. 23, 2013

(65) Prior Publication Data
US 2013/0263651 A1 Oct. 10, 2013

Related U.S. Application Data

(60) Provisional application No. 61/621,027, filed on Apr. 6, 2012.

(51) Int. Cl.
*G01M 15/14* (2006.01)
*G05B 23/02* (2006.01)
(52) U.S. Cl.
CPC .......... *G01M 15/14* (2013.01); *G05B 23/0248* (2013.01)
USPC ....................................... 73/112.01
(58) Field of Classification Search
USPC ....................................... 73/112.01
See application file for complete search history.

(56) References Cited

U.S. PATENT DOCUMENTS

| 5,068,080 A * | 11/1991 | Impink et al. ............... 376/215 |
| 5,517,585 A | 5/1996 | Dowling |
| 5,807,069 A | 9/1998 | Girbig |
| 5,913,184 A | 6/1999 | Girbig |
| 6,516,263 B1 | 2/2003 | Keller |
| 6,910,364 B2 | 6/2005 | Girbig |
| 8,010,320 B2 | 8/2011 | Volponi |
| 8,352,787 B2 * | 1/2013 | Hoshino et al. ............... 714/25 |
| 8,656,358 B2 * | 2/2014 | Taruishi et al. ............... 717/125 |
| 2005/0246039 A1 | 11/2005 | Iino et al. |

FOREIGN PATENT DOCUMENTS

EP 382391 A2 8/1990

OTHER PUBLICATIONS

Francesco Casella. "Fast Start-up of a Combined-Cycle Power Plant a Simulation Study with Modelica", Sep. 5, 2006, XP055043683, Retrieved from the Internet URL https//www.modelica.org/events/modelica2006 Proceedings/sessions/Session1a1 pdf [retrieved on Nov. 9, 2012] the whold document.

* cited by examiner

*Primary Examiner* — Freddie Kirkland, III

(57) ABSTRACT

Monitoring of transient operation of a turbine includes identifying a start condition and a stop condition for the transient operation and defining a path from the start condition to the stop condition wherein the path comprises a plurality of sequentially arranged sub-segments. Also, a respective value is obtained of each of a plurality of operating parameters for each respective sub-segment of the path and, then, for each of the respective sub-segments, a determination is made if the respective value of each of the plurality of operating parameters matches a respective predetermined allowable value for that particular operating parameter.

20 Claims, 6 Drawing Sheets

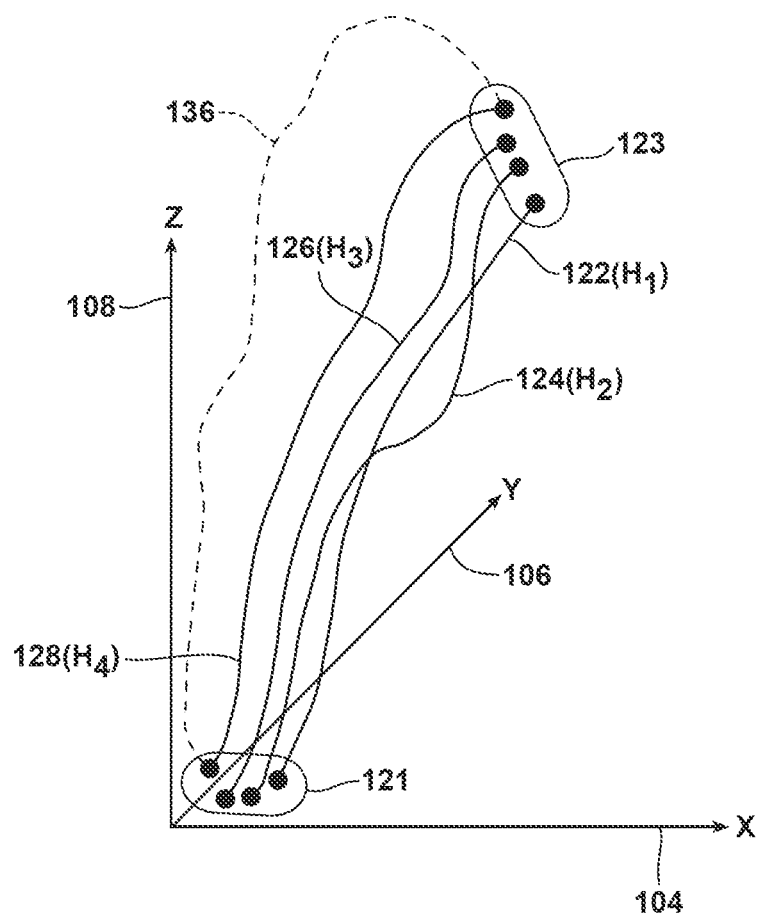

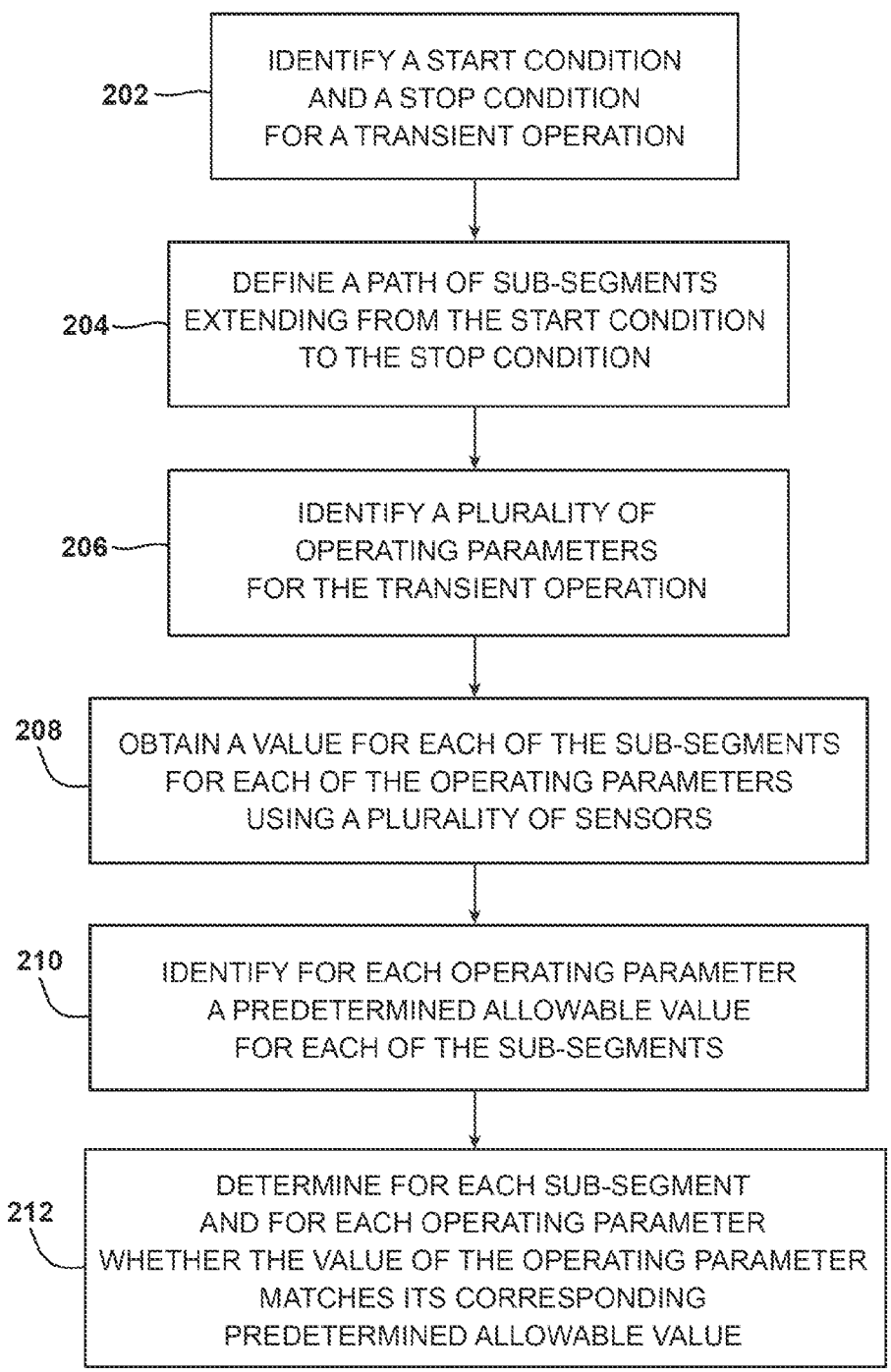

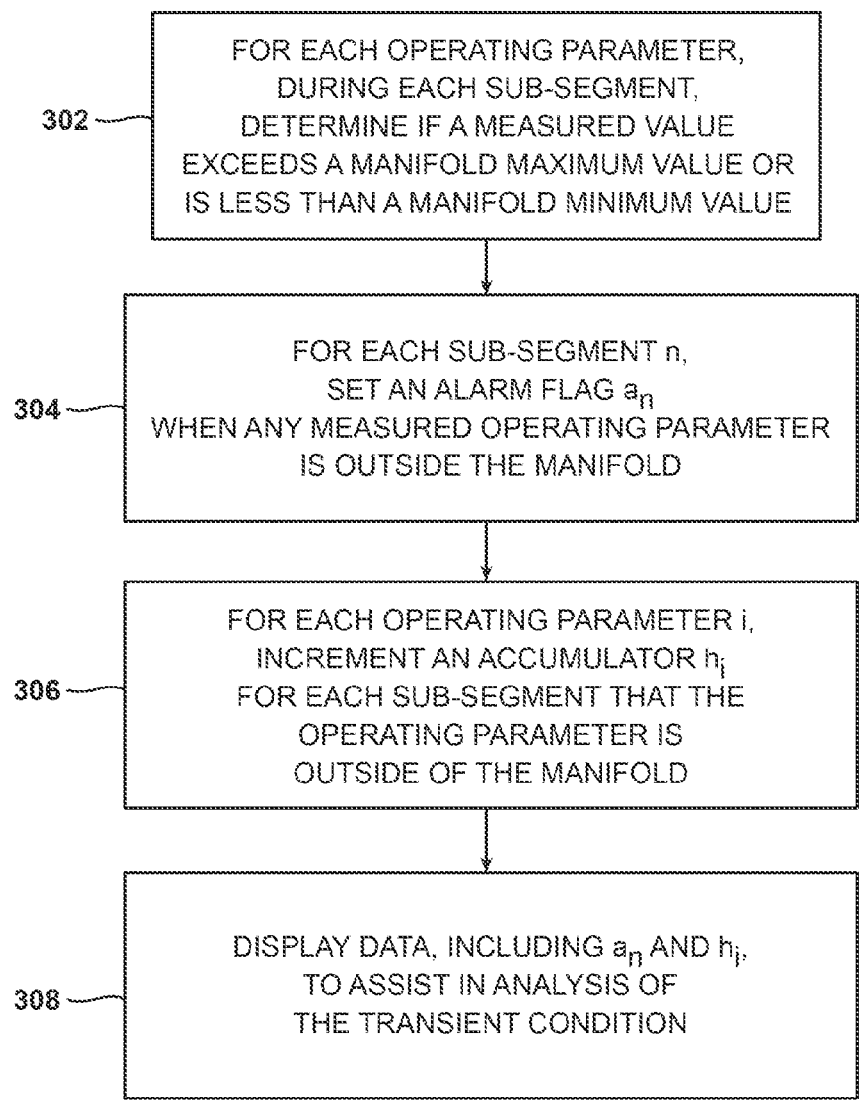

DETECTION AND CLASSIFICATION OF FAILURES OF POWER GENERATING EQUIPMENT DURING TRANSIENT CONDITIONS

CROSS REFERENCE TO RELATED APPLICATION

This application claims the benefit of U.S. Provisional Patent Application Ser. No. 61/621,027, filed Apr. 6, 2012, entitled "DETECTION AND CLASSIFICATION OF FAILURES OF POWER GENERATION EQUIPMENT DURING TRANSIENT CONDITIONS WITH PHASE SPACE MANIFOLDS DERIVED FROM RETURN MAPS OF ONLINE SENSOR DATA", the entire disclosure of which is incorporated by reference herein.

FIELD OF THE INVENTION

The present invention relates to the field of power generating equipment and, more particularly to failure analysis of power generating equipment.

BACKGROUND OF THE INVENTION

In general, power generating equipment (e.g., steam turbines, gas turbines, etc.) operates in two modes: steady-state and transient. In the steady-state mode, the operating parameters such as, for example, temperatures, pressures, fuel flows, electrical currents, etc., are substantially unchanging over time. The most common scenario for steady-state conditions in power generating equipment is base-load operation which is operation of the equipment at a particular rated thermal limit. Transient conditions apply in most other cases such as, for example, starting up, shutting down, fault or trip conditions, and load changes.

One conventional method of diagnosing steady-state faults in power generating equipment involves monitoring system sensors for deviations from expected values. The expected values are typically calculated from models of how the power equipment should ideally operate and then the values from the monitored sensors can be compared with the expected values. Because all the factors that affect the operation of the power equipment cannot be measured or monitored, the resulting mathematical model of the operation of the equipment may lack precision for some of the equipment operating parameters.

The conventional method described above may be useful for analysis of stead-state operation because the steady-state operation exhibits linear behavior which allows relatively fast analysis while the equipment is operating (i.e., on-line analysis). Transient conditions, however, are can vary rapidly and often in a non-linear manner. Accordingly, transient conditions of power generating equipment are more difficult to analyze. Thus, there remains a need for techniques, methods, and systems that effectively analyze transient conditions of power generating equipment, especially on-line analysis of such equipment.

SUMMARY OF THE INVENTION

Aspects of the present invention relate to a method for monitoring transient operation of a turbine. The method includes identifying a start condition and a stop condition for the transient operation and defining a path from the start condition to the stop condition wherein the path comprises a plurality of sequentially arranged sub-segments. Also, according to this method, a respective value is obtained of each of a plurality of operating parameters for each respective sub-segment of the path and, then, for each of the respective sub-segments, a determination is made if the respective value of each of the plurality of operating parameters matches a respective predetermined allowable value for that particular operating parameter.

In accordance with an additional aspect of the invention, a computer program product for monitoring transient operation of a turbine is provided in which there is a computer readable storage medium having computer usable program code embodied therewith. The computer usable program code includes code a) configured to identify a start condition and a stop condition for the transient operation; b) configured to define a path from the start condition to the stop condition wherein the path comprises a plurality of sequentially arranged sub-segments; c) configured to obtain a respective value of each of a plurality of operating parameters for each respective sub-segment of the path, and d) configured to determine, for each of the respective sub-segments, if the respective value of each of the plurality of operating parameters matches a respective predetermined allowable value for that particular operating parameter.

Yet another aspect of the present invention relates to a system for monitoring transient operation of a turbine. The system includes a controller component configured to identify a start condition and a stop condition for the transient operation and to define a path from the start condition to the stop condition wherein the path comprises a plurality of sequentially arranged sub-segments. Also included are a plurality of sensors, in communication with the controller component, configured to obtain a respective measurement value of each of a plurality of operating parameters for each respective sub-segment of the path. Furthermore, the system includes an analyzer in communication with the controller component, configured to determine, for each of the respective sub-segments, if the respective value of each of the plurality of operating parameters matches a respective predetermined allowable value for that particular operating parameter.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 1B depicts an example historical data set corresponding to four occurrences of a particular transient condition being monitored in accordance with the principles of the present invention;

FIG. 2 depicts a flow chart of an example method for monitoring transient conditions in power generating equipment in accordance with the principles of the present invention;

FIG. 3 depicts a flowchart of additional details of the exemplary method of FIG. 2 for monitoring transient conditions in accordance with the principles of the present invention.

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Using the techniques, methods and systems described herein, monitoring and analysis in an on-line fashion, or off-line, of transient operating conditions of power generating equipment can be performed. One example transient condition involves starting up a gas or steam turbine. Accordingly, details are provided herein for this particular example; however the principles of the present invention apply to other transient operating conditions as well such as, for example, shutdown, trips or faults, and load changes. During any of these, and other transient operating conditions, deviations of the power generating equipment from expected behavior can be detected.

Figure 1A:
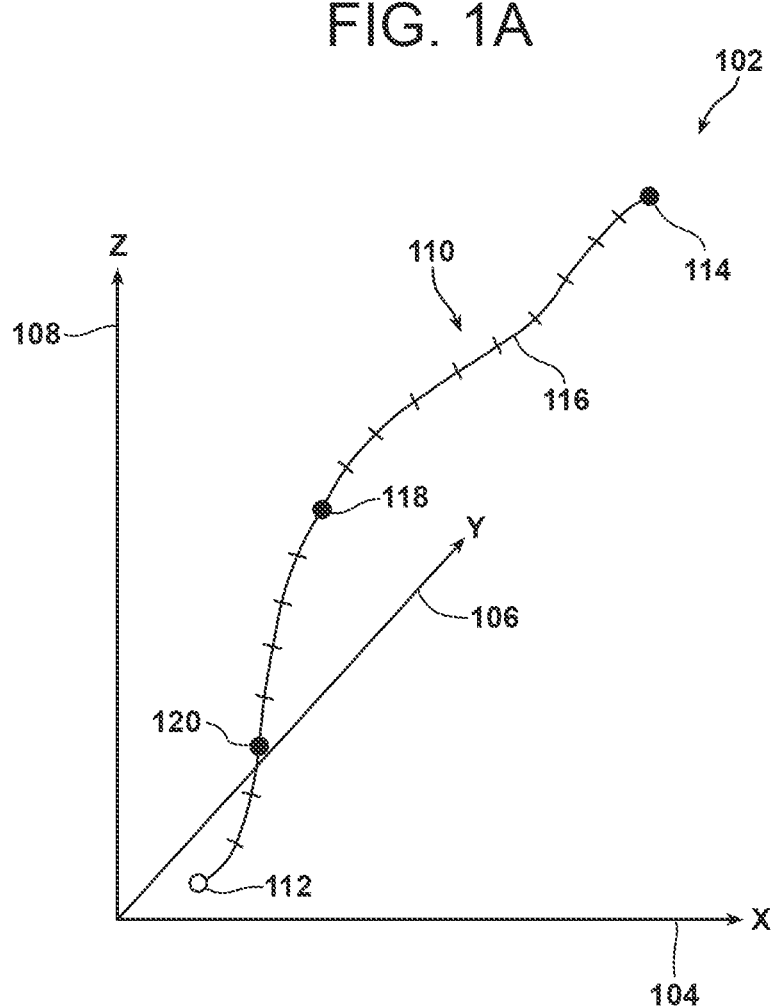
FIG. 1A depicts an example three-dimensional phase space in accordance with the principles of the present invention.

FIG. 1A depicts an example three-dimensional phase space in accordance with the principles of the present invention. A phase space 102 can be created in which power generating equipment (e.g., "a system") can be analyzed. The phase space is a coordinate space in which all possible states of the system can be recorded as points in the space. Each of the measurable operating parameters being considered when monitoring the transient operating condition of the system is a respective dimension in the phase space 102. For example, operating parameters can include fuel flow, for example depicted as the x-axis 104, blade speed, for example depicted as the y-axis 106, and average blade path temperature, for example depicted as the z-axis 108. If these three operating parameters are the measurable parameters defining an example phase space, then that phase space is three-dimensional. At a particular time (e.g., t=1) during transient operation of the system, fuel flow will have a measurable value of $x_1$, blade speed will have a measurable value of $y_1$, and blade path temperature will have a measurable value of $z_1$. Thus, that state of the system 118 can be defined as a coordinate point $(x_1, y_1, z_1)$ in the example three-dimensional phase space 102. Similarly, any state of the system at a particular time, t, can be defined within the example three-dimensional phase space by a 3-tuple coordinate of $(x_t, y_t, z_t)$ where $x_t$ is a measurable value of the fuel flow at time t, $y_t$ is a measurable value of the blade speed at time t, and $z_t$ is a measurable value of the blade path temperature at time t. Thus, associated with each of the three-dimensional coordinates that define a particular location in the phase space 102 there can be an additional parameter (e.g., time t). As described below, a parameter other than time such as, for example, turbine speed can be associated with a set of coordinates in a phase space. In that instance, the respective values for the measurable operating parameters when the turbine is at various speeds define various respective points in the phase space.

By considering more than just three operating parameters for the system, a phase space of more than three dimensions can be defined. For example, if 350 operating parameters for the system during transient operation are considered, then a 350-dimensional phase space would be defined such that each possible state of the system would be a 350-tuple coordinate value within that phase space. Thus, one of ordinary skill will readily recognize that the principles of the present invention apply to phase spaces of any dimensional size. However, because a three-dimensional phase space is simpler to depict graphically, example figures are provided herein which relate to a three-dimensional phase space even though embodiments of the present invention are not limited to only that size of a phase space.

Example operating parameters, particularly for turbine starts, can include, for example, blade path temperatures, flashback temperatures, fuel flows, fuel temperatures, fuel pressures, disc cavity temperatures, exhaust temperatures, shell temperatures, inlet temperatures, inlet pressure, and various valve positions. Other sensors and parameters can be considered as well without departing from the scope of the present invention.

Once a phase space has been defined, a state vector can be described which is a path through the phase space that shows how the system transitions from one state to the next. For example, if the monitored system transitions from one state $(x_1, y_1, z_1)$ to a next state $(x_2, y_2, z_2)$, then these two coordinates in the phase space define a vector between the two coordinates, (i.e., $(x_2-x_1, y_2-y_1, z_2-z_1)$).

Associated with the system is a set of "S" sensors where "S" is an integer and each sensor measures an operating parameter of the system during the transient condition. For example, in the earlier discussion, S=3. A respective state of the system is measured at each of a series of points in time (see, for example, point 120). In other words, a system state, or point in the phase space is created at to and then, subsequently, another point in the phase space is created at $t_{n+1}$. As the number of points in the series increases, the series of state vectors between each adjacent point describe the complete set of state transitions for the system being monitored.

Ideally, the phase space technique described above for characterizing the operation of a system benefits from a system that has a starting state at time $t_1$ and a stopping state at time $t_N$ that occur at substantially the same point within the phase space. When this occurs, the entire state vector defines an orbital path and the starting and stopping conditions of the phase space analysis are easily defined. However, in some instances of monitoring power generating equipment, i.e., a turbine-generator system, during transient conditions, an orbital path may not be well defined. In these instances, a segment 110 of an entire state vector can be selected wherein the selected segment 110 is a relatively stable sub-path of an orbital path.

A segment 110 is selected by identifying a specific starting condition and a specific ending condition within the entire series of state transition vectors. For example, when the transient condition being considered is a turbine start operation, then the starting condition can be defined as when an operator ignites the fuel and the ending condition can be defined as when a breaker closes, such as to connect the generator to a power supply system. At the time the starting condition is met, the system state corresponds to a particular starting point 112 in the phase space 102 and when the ending condition is satisfied, the system state corresponds to an ending point 114 in the phase space 102. The segment 110 is characterized by the state transitions that take place between the starting point 112 and the ending point 114. As described below, other transient conditions, starting conditions, and ending conditions are considered within the scope of the present invention as well.

One example ending point 114 for a turbine start transient condition corresponds to when the turbine reaches a full-speed-no-load condition. When the turbine achieves that condition, then the segment ending point 114 has been determined. In addition to a defined event or a specific sensor condition being used to define an ending point for a defined segment, a predetermined time interval can define the ending point 114 as well. For example, again using a turbine start as an example transient condition, the ending point 114 for the segment 110 can be defined as "the system state 15 minutes after the starting condition".

Thus, a specific starting point 112 and a specific ending point 114 define a path or segment 110 of the entire state vector and between these two endpoints a number of other points 120 are defined at predetermined time intervals. The defined path, therefore, can be considered to be comprised of a sequential series of sub-segments 116 wherein a state transition vector describes how the state of the system changes between the two endpoints of each sub-segment.

Figure 1C:
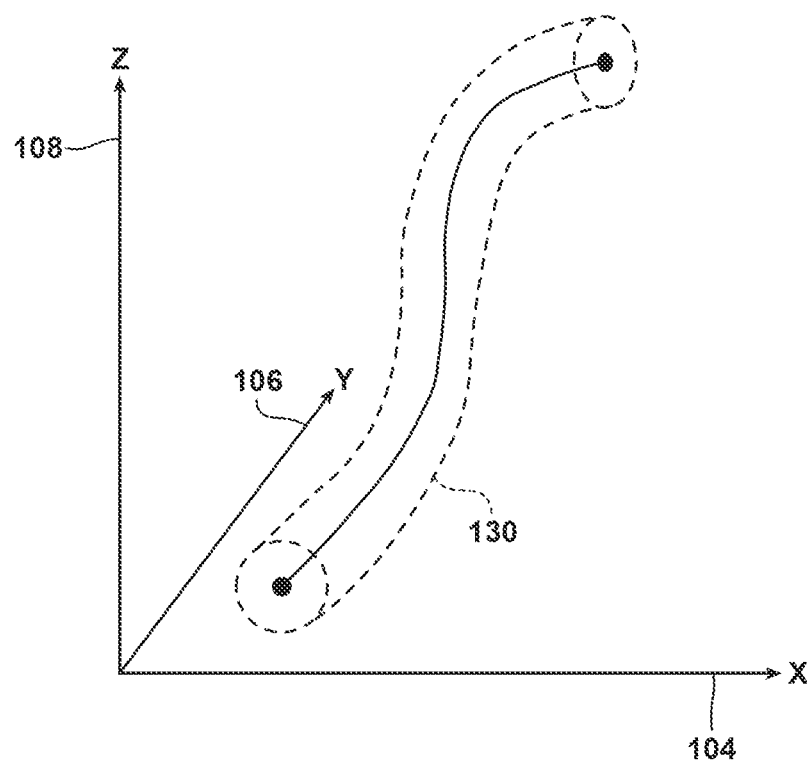
FIG. 1C depicts a conceptualized manifold boundary in accordance with the principles of the present invention.

For a particular defined path or segment 110, a "manifold" (see 130 of FIG. 1C) can be defined which can be considered as a surface within the phase space that defines a boundary outside of which the transient condition from the starting point to the ending point may become unstable. In other words, if the state of a system (i.e., one of the sub-segments 116) arrives at a coordinate location in the phase space 102 which lies outside of the manifold, then the transient condition of the system has likely arrived at an unstable state and the system will likely fail to operate properly. Thus, the manifold defines the boundaries in the phase space outside of which the operation of the system during the transient condition has likely become unstable.

One technique for defining a manifold for a segment of a transient condition is to rely on historical data relating to that particular transient condition. For example, with turbine starts, data related to a number of different, previous turbine starts may be available for similar power generating equipment. In particular, using historical data from successful turbine starts is beneficial for constructing a manifold such that any starts which fall outside that manifold will likely correspond to a failed or problematic start.

This available historical data comprises data for sensors related to the phase space in which the defined segment or path 110 exists. Thus, if the phase space, such as phase space 102 of FIG. 1A, has three dimensions defined by the operating parameters fuel flow, blade speed, and blade path temperature, then the historical data of interest will have sensor data for these three operating parameters from a number of previous, successful turbine starts as well. In particular, for each of the previous, successful turbine starts, the data for that start may include the values for fuel flow, blade speed and blade path temperature from a time before an igniter was activated until sometime after a "breaker-close" is detected.

The time points that define the sub-segments 116 of the segment 110 define a respective time period after the starting point 112 at which each sub-segment 116 occurs. Each different turbine start in the historical data likewise includes a starting condition occurrence (e.g., igniter activation) corresponding to the starting point 112 as well a sensor data collected after the starting condition. This historical, collected sensor data includes portions corresponding to each of the sub-segments 116. Thus, the set of transient conditions that are included in the historical data can each be considered as a respective series of state transition vectors that traverse a respective segment or path from the starting point 112 to the ending point 114.

FIG. 1B depicts an example historical data set corresponding to four occurrences of the particular transient condition being monitored and this data can be used to reconstruct four respective paths 122, 124, 126 and 128 through the phase space 102. Each of the paths 122, 124, 126, 128 starts at its own respective starting point corresponding to a defined starting condition 121, and ends at its own respective ending point corresponding to a defined ending condition 123. At each point-in-time (i.e., sub-segment 116), the historical data corresponding to that particular sub-segment can be used to define the manifold boundary for that sub-segment. Considered together, the series of respective manifold boundaries thus determines a manifold boundary 130 for the entire segment or path 110.

At each sub-segment 116, there are S operating parameters being monitored and corresponding S values in each transient condition set in the historical data, where S also represents the number of sensors and the dimension of the phase space. Accordingly, for each sub-segment 116 in a series of n sub-segments, its particular, respective manifold boundary will have S values, each corresponding to one of the operating parameters being monitored.

Using the example of FIG. 1A and FIG. 1B, there is data from four historical instances of a particular transient condition ($H_1$, $H_2$, $H_3$, $H_4$), corresponding to the paths 122, 124, 126, 128 seen in FIG. 1B, having corresponding data for each of the sub-segments 116 in a three-dimensional phase space 102. Also, each sub-segment 116 can be considered to correspond to time $t_n$, where $t_0$ corresponds to the starting point 112, $t_m$ corresponds to the ending point 114, and $t_0 \leq t_n \leq t_m$.

The nomenclature $H_1(t_n)$ can be used to refer to a three dimensional coordinate ($x_{1n}$, $y_{1n}$, $z_{1n}$) that represents the values, during sub-segment n, for fuel flow, blade speed, and blade path temperature in the first historical set. Similarly, three other coordinates corresponding to sub-segment n are included in the other three historical data sets as well: $H_2(t_n)=(x_{2n}, y_{2n}, z_{2n})$; $H_3(t_n)=(x_{3n}, y_{3n}, z_{3n})$, and $H_4(t_n)=(x_{4n}, y_{4n}, z_{4n})$.

Using the historical data for fuel flow (i.e., $x_{1n}$, $x_{2n}$, $x_{3n}$, $x_{4n}$) for sub-segment n, a boundary value for the fuel flow value for this segment can be calculated. Thus, when a transient condition is being monitored, the currently measured value for fuel flow can be compared to the calculated boundary value to determine if the measured value is within the manifold 130. Given a historical range of values for a particular parameter, one of ordinary skill will recognize that a variety of different techniques can be used to determine a corresponding boundary value. Least-squares fit, center-of-mass-calculations, etc. can be used. Another exemplary technique is to calculate a mean value, a minimum value and a maximum value based on the historical data.

Thus, for each sub-segment n a multi-valued boundary value for the fuel flow operating parameter can be calculated according to:

$$x_{n\,est} = \frac{1}{4}\sum_{k=1}^{4} x_{k\,n}$$

$$x_{n\,min} = \min(x_{1n}, x_{2n}, x_{3n}, x_{4n})$$

$$x_{n\,max} = \max(x_{1n}, x_{2n}, x_{3n}, x_{4n})$$

The value $x_{n\,est}$ represents an expected value for the monitored fuel flow sensor for sub-segment n. The values $x_{n\,min}$ and $x_{n\,max}$ define a range of values for the monitored fuel flow sensor for sub-segment n. In other words, the values $x_{n\,min}$ and $x_{n\,max}$ define the manifold boundary for the fuel flow operating parameter for the sub-segment n. If the value of the monitored fuel flow sensor lies outside this range of values, then the system state of the segment 110 has traveled outside of the manifold 130.

The diameter of the manifold value for this operating parameter, for this sub-segment, is represented by $d_{nx} = (x_{n\,max} - x_{n\,min})$ and one-half of the diameter $d_{nx}$ provides a corresponding radius $r_{nx}$ for this particular operating parameter for sub-segment n. This information can, for example, be used to select which historical sets of data are included when calculating a manifold. The value $r_{nx}$ is representative of the variability within the data for a particular operating parameter (e.g., x=fuel flow) and a particular sub-segment (e.g., sub-segment n). Historical data sets that result in large radii values for multiple operating parameters or multiple sub-segments represent data that more widely varies than sets producing small radii. Thus, historical sets can be selected, or ignored, based on what type of data variance is desired when calculating the manifold 130.

In general, an operator can be presented with a number of historical data sets from which a subset can be selected to calculate an appropriate manifold 130. Various turbine operating parameters can vary depending on the seasonal environment, the age of different components, and other environmental characteristics. Thus, an operator can select those historical sets for transient conditions that occurred in an environment similar to the one being measured. Also, the transient condition, itself, (e.g., turbine start, shutdown, trip, fault, load change, etc.) can be used by an operator to select an appropriate subset of available historical data.

The selection of the historical data can be more refined as well. For example, one set of historical data for a transient condition (e.g., path 122 of FIG. 1B) may have reasonably good data for all of the operating parameters except for one. This may occur, for example, if the fuel flow sensor was malfunctioning for that historical data but all the other sensors were operating properly. In this instance, an operator can specify which of the operating parameters for a historical data set to include and which ones to exclude. Thus, the body of historical data considered for calculating a manifold can include four sets of historical data that have blade path temperature related data and blade speed related data, but only three sets of fuel flow related data.

The example above regarding boundary values for a sub-segment involved only one of the operating parameters. A similar calculation may be used to determine the respective boundary values of the manifold 130, for each sub-segment and each operating parameter. In other words, for a sub-segment n, the following values may be calculated as well:

$$y_{n\,est} = \frac{1}{4}\sum_{k=1}^{4} y_{k\,n}$$

$$y_{n\,min} = \min(y_{1n}, y_{2n}, y_{3n}, y_{4n})$$

$$y_{n\,max} = \max(y_{1n}, y_{2n}, y_{3n}, y_{4n})$$

$$z_{n\,est} = \frac{1}{4}\sum_{k=1}^{4} z_{k\,n}$$

$$z_{n\,min} = \min(z_{1n}, z_{2n}, z_{3n}, z_{4n})$$

$$z_{n\,max} = \max(z_{1n}, z_{2n}, z_{3n}, z_{4n})$$

Thus, for a manifold 130 related to a path having, for example, 100 sub-segments and three operating parameters defining the phase space, there may be 300 different measured operating parameters during a transient condition that can be compared to appropriate manifold values to determine whether a monitored transient condition follows a path 110 that stays within the manifold 130 or follows a path 136 that diverges outside of the manifold 130.

FIG. 2 depicts a flow chart of an example method for monitoring transient conditions in power generating equipment, as described above, in accordance with the principles of the present invention using a programmable computer. In step 202, a specific start condition and stop condition is identified that defines a segment of a transient condition to be monitored.

In step 204, the segment from step 202 is further separated into a plurality of sub-segments, each corresponding to a moment in time relative to the starting condition of the segment. Separately, in step 206, a number of operating parameters relevant to the transient condition are identified. Each operating parameter corresponds to a sensor that can measure data of the system during the transient condition.

Thus, in step 208, a value for each operating parameter for each sub-segment is obtained during operation of the system during the transient condition. Independent of step 208, predetermined allowable values have been calculated, in step 210, for each operating parameter in each of the different sub-segments. Thus, in step 212, it can be determined for each sub-segment whether or not each of the operating parameters have a measured value from step 208 that "matches" its corresponding allowable value for that particular sub-segment. Depending on the outcome of step 212, various error data can be determined.

FIG. 3 depicts a flowchart of more details regarding monitoring transient conditions in accordance with the principles of the present invention. An "error condition" can be defined as any occurrence of an operating parameter, for a particular sub-segment, strays outside the manifold. Thus, a programmable computer system can determine, in step 302, for each sub-segment n whether a measured value of an operating parameter is greater than its allowable maximum value or less than its allowable minimum value as defined by the calculated manifold 130.

Thus, during a measured transient condition, there are multiple error conditions that can occur and it is beneficial to collect values related to the error conditions to aid in characterizing or analyzing the transient condition.

Considering, for example, the sub-segment n, if any of the measured operating parameter values $(x_n, y_n, z_n)$ are outside the manifold, then, in step 304, an alarm value $a_n$ can be set to equal "1" for the sub-segment n. If none of the operating parameters are outside of the manifold, then the value for $a_n$ can be set to "0".

Also, as discussed above, for each sub-segment there is a corresponding estimated or predicted value for each of the operating parameters. In the example above, for fuel flow, $x_{n\,est}$ represented the predicted value from the historical data sets for what the measured fuel flow value $x_n$ should be in sub-segment n during the transient condition currently being monitored. When an error condition for an operating parameter for a sub-segment occurs, then an amount by which the measured valued falls outside the manifold is also useful. The difference, such as an absolute difference, between the predicted value and measured value (e.g., $x_{n\,dev} = |x_n - x_{n\,est}|$) provides an indication of how far the measured value varied from an expected value. This value, $x_{n\,dev}$, can also be a normalized value because some operating parameters may vary over a wider range of values than others. Thus, a normalized calculation would take into account the value $d_{nx}$ from above according to $x_{n\,dev} = (|x_n - x_{n\,est}|/d_{nx})$ and allow a more relevant comparison between deviation values of the different operating parameters.

Looking closer at each of the measured operating parameters, if it is the $x_n$ value that is outside the manifold, then an accumulator $h_i$ can be incremented, in step 306, where i is an index value pointing to a particular one of the operating parameters (e.g., i=1 points to the first operating parameter "fuel flow" and i=2 points to the second operating parameter "blade speed"). The amount the accumulator $h_i$ is incremented for each sub-segment n can be based on the value of $x_{n\ dev}$ for that sub-segment. Once all the n sub-segments have been evaluated, from $t_0 \leq t_n \leq t_m$, the value $h_i$ will represent a cumulative measure of how much the operating parameter corresponding to index=i varied outside the manifold 130 during the segment 110.

Thus, when monitoring a transient condition, the following values can be calculated for each sub-segment:

a respective measured value (e.g., $x_n$) for each of the operating parameters;

a predicted value for each of the operating parameters (e.g., $x_{n\ est}$) based on the historical data of what the measured value for the sub-segment is expected to be;

a minimum value for each of the operating parameters (e.g., $x_{n\ min}$) based on the historical data that represents a minimum allowable boundary value for this particular operating parameter;

a maximum value for each of the operating parameters (e.g., $x_{n\ max}$) based on the historical data that represents a maximum allowable boundary value for this particular operating parameter;

an alarm value (e.g., $a_n$) that indicates whether any of the operating parameters were outside their allowable boundary values for this sub-segment;

a deviation value for each of the operating parameters (e.g., $x_{n\ dev}$) that represents a normalized value for how far the measured value for the particular operating parameter (e.g., $x_n$) varied from its predicted value (e.g., $x_{n\ est}$).

Other values that can be calculated include:

a histogram value for each operating parameter (e.g., $h_i$) that provides a cumulative measure for those of the n sub-segments that this particular operating parameter was outside of its allowable boundary values.

These values described above permit analysis and monitoring of a transient condition of power generating equipment while it is occurring (e.g., on-line) or once it has occurred as a way to perform fault analysis of failed operating behavior. For example, a record of a monitored transient condition can include two dimensional data for each of the operating parameters where one dimension is time (e.g., $t_n$) and the other dimension is the measured value of the operating parameter (e.g., $x_n$) for each sub-segment n. Thus, for example in step 308, values for a particular operating parameter can be displayed in a conventional line chart. As is known in the art, the scale of the line chart can vary so that an operator can view details of a relatively small time interval or view general data trends by looking at a relatively large time interval.

Initially, an operator can be presented a list of available records of different transient conditions that can be viewed for analysis. From this list, the operator can select one of the records of transient conditions and be presented with a list of operating parameters that comprise the phase space for this particular transient condition record. In particular, the histogram information $h_i$ can be used to present the list of the operating parameters to the operator in a particular order. For example, those operating parameters having a higher $h_i$ relate to particular operating parameters that varied outside of allowable values to a greater extent than other operating parameters. Thus, the operating parameters can be presented in a list in descending order based on $h_i$. Furthermore, in step 308, the values for $a_n$ or $h_i$ can be displayed for the operator as well.

If each operating parameter is classified in a subsystem of the overall power generating system, then the ranked list of operating parameters may reveal which of the subsystems is likely a culprit for a failing performance during a transient condition. In addition, the operator can select a particular operating parameter from the ranked list and display the measured values, the deviation values, or some combination thereof, to more clearly determine when in the path 110, that operating parameter may have varied outside the calculated manifold. Example subsystem classes include blade path temperature, exhaust temperature, flashback temperatures, turbine outlet temperature, disc cavity temperature, fuel flow, inlet temperature and pressure, combustor shell temperature and pressure, etc.

In the above description, specific examples were provided to aid in explanation and understanding of the principles of the present invention. In particular, the transient condition of "turbine start" was used but one of ordinary skill will recognize that other transient conditions can be monitored and analyzed as well without departing from the scope of the present invention. Similarly, in many instances a phase space of three dimensions was discussed while the principles of the present invention equally apply to a phase spaces of other dimensional size. The operating parameters "fuel flow", "blade path temperature", and "blade speed" were used as merely examples as well, and a multitude of other operating parameters that can be accurately measured relative to power generating equipment can be used in addition to, or instead of, these three example parameters.

In addition to turbine start, one transient condition of interest is gas turbine shutdown for which starting and ending conditions may be identified to define a segment path. For V-frame engines, a specific starting condition may be when the gas and oil overspeed trip valves close, cutting off the fuel supply. For W-frame engines a signal may be present that indicates whether or not the turbine is running. When this signal is deactivated, this indicates the start of the turbine shutdown. A specific ending condition can be when the turbine rotational speed is 100 RPMs or some other predetermined speed. During shutdown, some of the operating parameters of interest can include bearing metal temperatures, blade path temperatures, exhaust temperatures, flashback temperatures, vibrations, and inlet guide vane position.

Steam turbine starts are another example transient condition that may be monitored in a manner similar to the techniques described above that are particularly useful for gas turbines. In the above description, time was the independent variable or parameter which was used to define the different sub-segments. In contrast, steam turbines do not necessarily have operating parameters that are easily related to time and thus, another independent variable may be useful. One example operating parameter useful for defining the sub-segments of the state vector for steam turbines is "turbine speed". For example, the sub-segments would be defined as 50 RPM intervals from a starting speed and ending at a final speed (or any other predetermined speed interval). Accordingly, the manifold values would be defined relative to turbine speed rather than time as would the measurement of operating parameter values of the transient condition.

In general, transient conditions of power generating equipment that have a state vector that traverses a relatively stable path, an orbital path, or at least a segment that is partially a stable path to allow identifying a beneficial starting and ending condition can be monitored and analyzed with techniques described above. Thus, analysis and monitoring of gas turbines, steam turbines, generators, heat recovery steam generators, etc. are all considered within the scope of the present invention.

Figure 4:
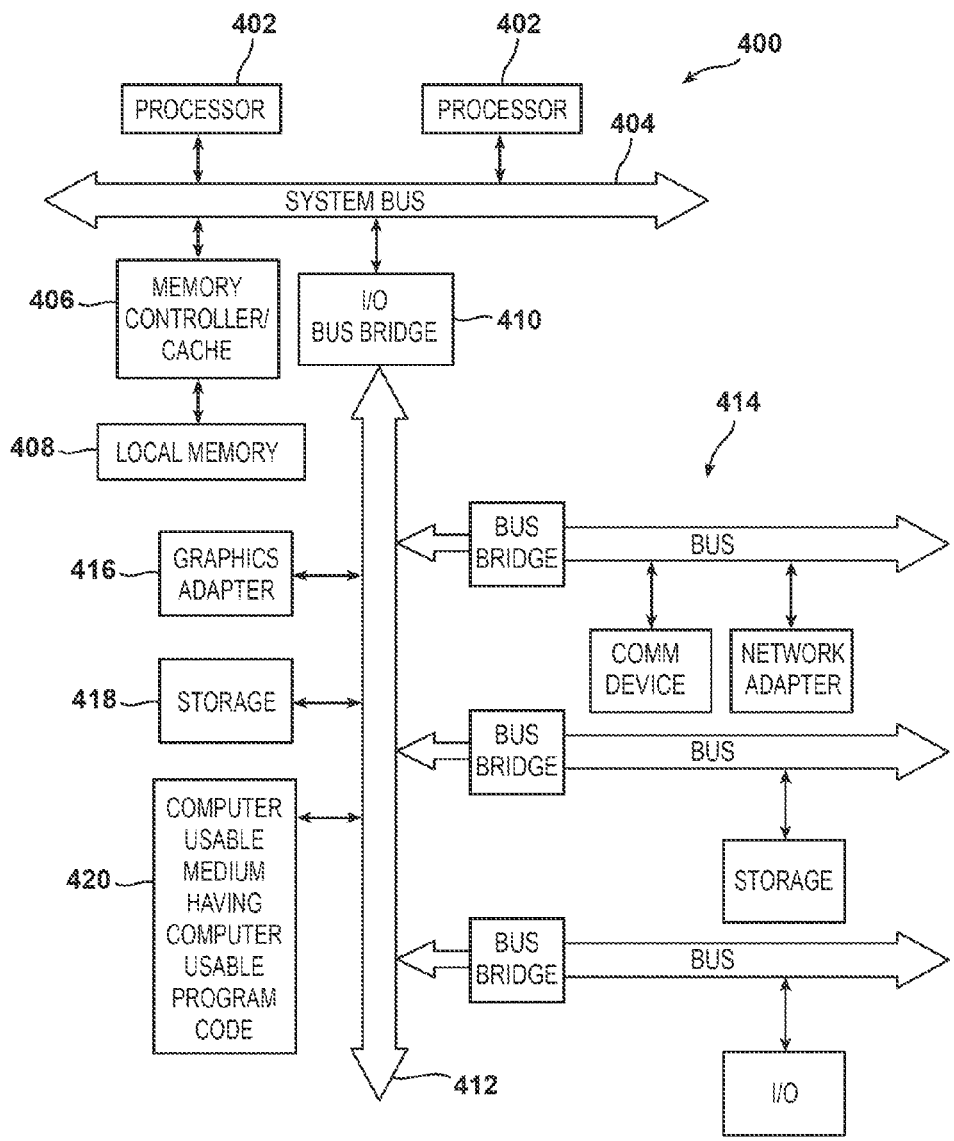
FIG. 4 is a block diagram of a data processing system in accordance with the principles of the present disclosure.

Referring to FIG. 4, a block diagram of a data processing system is depicted in accordance with the present disclosure. A data processing system 400, such as may be utilized to implement the hardware platform 108 or aspects thereof, e.g., as set out in greater detail in FIG. 1A-FIG. 3, may comprise a symmetric multiprocessor (SMP) system or other configuration including a plurality of processors 402 connected to system bus 404. Alternatively, a single processor 402 may be employed. Also connected to system bus 404 is memory controller/cache 406, which provides an interface to local memory 408. An I/O bridge 410 is connected to the system bus 404 and provides an interface to an I/O bus 412. The I/O bus may be utilized to support one or more busses and corresponding devices 414, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 416, storage 418 and a computer usable storage medium 420 having computer usable program code embodied thereon. The computer usable program code may be executed to execute any aspect of the present disclosure, for example, to implement aspects of any of the methods, computer program products and/or system components illustrated in FIG. 1A-FIG. 3.

Aspects of the present disclosure may be implemented entirely via hardware, entirely via software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for monitoring transient operation of a turbine, comprising:
identifying a start condition and a stop condition for the transient operation;
defining a path from the start condition to the stop condition wherein the path comprises a plurality of sequentially arranged sub-segments;
obtaining a respective value of each of a plurality of operating parameters for each respective sub-segment of the path; and
for each of the respective sub-segments, determining if the respective value of each of the plurality of operating parameters matches a respective predetermined allowable value for that particular operating parameter.

2. The method of claim 1, further comprising:
determining a respective error score for each of the plurality of operating parameters based, at least in part, on:
in how many of the respective sub-segments there is an occurrence that the respective value for a particular one operating parameter did not match the respective predetermined allowable value for that particular operating parameter for that particular sub-segment.

3. The method of claim 2, further comprising:
ranking the plurality of operating parameters based on their respective error score.

4. The method of claim 1, wherein the respective predetermined allowable value for a particular operating parameter for a particular sub-segment comprises a range of values having a minimum value and a maximum value and, wherein, the respective value for the operating parameter for the particular sub-segment matches the respective predetermined allowable value if the respective value for the operating parameter is less than or equal to the maximum value and greater than or equal to the minimum value.

5. The method of claim 1, further comprising:
for each of the plurality operating parameters, calculating the respective predetermined allowable value for each of the respective sub-segments of the path.

6. The method of claim 5, wherein, for a particular one of the plurality of operating parameters, the calculating of the respective predetermined allowable value for each of the respective sub-segments of the path, comprises:
identifying a plurality of historical instances of the transient operation;
for each historical instance, determining a respective measured value of that particular one operating parameter for each of the respective sub-segments of the path; and
for each respective sub-segment, combining the respective measured values to calculate the respective predetermined allowable value for that particular one operating parameter.

7. The method of claim 6, wherein each respective predetermined allowable value includes a respective maximum value, a respective minimum value, and a respective expected value.

8. The method of claim 1, further comprising:
for each of the respective sub-segments, identifying a respective predetermined estimated value for each of the plurality of operating parameters.

9. The method of claim 8, further comprising:
for each of the respective sub-segments, identifying a respective predetermined range of values for each of the plurality of operating parameters.

10. The method of claim 9, further comprising:
when, for a particular respective sub-segment, a respective value of a particular operating parameter does not match the respective predetermined allowable value for that particular operating parameter, then determining a respective deviation amount for that particular operating parameter for that particular sub-segment based on the respective value of the particular operating parameter and the respective predetermined estimated value.

11. The method of claim 10, further comprising:
normalizing the respective deviation amount based on the respective predetermined range of values.

12. The method of claim 1, wherein:
the transient operation comprises a turbine start;
the start condition comprises igniter activation; and
the stop condition comprises closing of a breaker.

13. The method of claim 1, wherein:
the transient operation comprises a turbine shutdown;
the start condition comprises deactivation of a turbine running signal; and
the stop condition comprises turbine rotational speed reaching a predetermined value.

14. The method of claim 1, wherein:
the transient operation comprises a turbine shutdown;
the start condition comprises an overspeed trip valve closing; and
the stop condition comprises turbine rotation speed reaching a predetermined value.

15. The method of claim 1, wherein each of the respective sub-segments correspond to a different time between the start condition and the stop condition.

16. The method of claim 1, wherein each of the respective sub-segments correspond to a different turbine rotational speed between the start condition and the stop condition.

17. A computer program product for monitoring transient operation of a turbine, comprising:
a non-transitory computer readable storage medium having computer usable program code embodied therewith, the computer usable program code comprising:
computer usable program code configured to identify a start condition and a stop condition for the transient operation;
computer usable program code configured to define a path from the start condition to the stop condition wherein the path comprises a plurality of sequentially arranged sub-segments;
computer usable program code configured to obtain a respective value of each of a plurality of operating parameters for each respective sub-segment of the path; and
computer usable program code configured to determine, for each of the respective sub-segments, if the respective value of each of the plurality of operating parameters matches a respective predetermined allowable value for that particular operating parameter.

18. The computer program product of claim 17, further comprising:
computer usable program code configured to determine a respective error score for each of the plurality of operating parameters based, at least in part, on the respective sub-segments in which there is an occurrence of the respective value for a particular one operating parameter not matching the respective predetermined allowable value for that particular operating parameter for that particular sub-segment.

19. A system for monitoring transient operation of a turbine, comprising:

a controller component configured to identify a start condition and a stop condition for the transient operation and to define a path from the start condition to the stop condition wherein the path comprises a plurality of sequentially arranged sub-segments;

a plurality of sensors, in communication with the controller component, configured to obtain a respective measurement value of each of a plurality of operating parameters for each respective sub-segment of the path; and an analyzer in communication with the controller component, configured to determine, for each of the respective sub-segments, if the respective value of each of the plurality of operating parameters matches a respective predetermined allowable value for that particular operating parameter.

20. The system of claim 19, wherein the analyzer is further configured to determine a respective error score for each of the plurality of operating parameters based, at least in part, on the respective sub-segments in which there is an occurrence of the respective value for a particular one operating parameter not matching the respective predetermined allowable value for that particular operating parameter for that particular sub-segment.

* * * * *